(12) United States Patent
Kawakami (10) Patent No.: US 9,156,518 B2
(45) Date of Patent: Oct. 13, 2015

(54) CABLE OPERATING MECHANISM

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 2088 days.

(21) Appl. No.: 12/233,754

(22) Filed: Sep. 19, 2008

(65) Prior Publication Data

US 2010/0071498 A1 Mar. 25, 2010

(51) Int. Cl.
*B62K 23/06* (2006.01)
*B62M 25/04* (2006.01)

(52) U.S. Cl.
CPC ............... *B62K 23/06* (2013.01); *B62M 25/04* (2013.01); *Y10T 74/20408* (2015.01)

(58) Field of Classification Search
USPC ............... 74/502.2, 488, 489, 473.14, 473.15
IPC ........................ F16C 1/10; B62M 25/00,25/04
See application file for complete search history.

(56) References Cited

U.S. PATENT DOCUMENTS

| 4,019,402 A | | 4/1977 | Leonheart | |
|---|---|---|---|---|
| 4,653,613 A | * | 3/1987 | Blancas | .......................... 74/489 |
| 5,730,030 A | * | 3/1998 | Masui | ............................ 74/502.2 |
| 5,896,779 A | * | 4/1999 | Biersteker et al. | ........... 74/502.2 |

FOREIGN PATENT DOCUMENTS

| EP | 0671317 A | 9/1995 |
|---|---|---|
| EP | 1591353 A | 11/2005 |
| EP | 185135 A | 11/2007 |
| WO | WO 9503208 A1 * | 2/1995 |

OTHER PUBLICATIONS

Description of WO9503208. Aug. 11, 2011. http://translationportal.epo.org/emtp/translate/?ACTION=description-retrieval&COUNTRY=WO&FORMAT=docdb&KIND=A1&LOCALE=en_EP&NUMBER=9503208&OPS=ops.epo.org&TRGLANG=en&ENGINE=google&SRCLANG=de.*
European Search Report of corresponding EP Application No. 09 152 759.8 dated Sep. 30, 2011.

* cited by examiner

*Primary Examiner* — Daniel Yabut
(74) *Attorney, Agent, or Firm* — Global IP Counselors (57) ABSTRACT

A cable operating mechanism is basically provided with a fixed member, a wire takeup member, a wire pulling member and a movement transmission member. The wire takeup member is movably mounted with respect to the fixed member about a first pivot axis to move between a plurality of predetermined wire positions. The wire takeup member includes a wire attachment part. The wire pulling member is movably mounted with respect to the fixed member. The movement transmission member is pivotally mounted with respect to the fixed member about a second pivot axis that is offset from the first pivot axis. The movement transmission member is operatively coupled to the wire pulling member and the wire takeup member such that a movement of the wire pulling member is transmitted to the wire takeup member via the movement transmission member.

10 Claims, 10 Drawing Sheets

CABLE OPERATING MECHANISM

BACKGROUND OF THE INVENTION

1. Field of the Invention

This invention generally relates to a cable operating mechanism. More specifically, the present invention relates to a cable operating mechanism for a cable operated bicycle shifter that operates a rear derailleur.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

One part of the bicycle that has been extensively redesigned is the bicycle transmission. Specifically, a bicycle transmission typically includes front and rear shift operating devices designed to operate front and rear derailleurs to move the derailleurs laterally over a plurality of sprockets or gears. The sprockets or gears are usually coupled to the front crank and the rear wheel such that a pedaling force from the rider is transferred to the rear wheel via the chain.

In the case of a rear derailleur, usually, the rear derailleur is configured to be able to shift the chain between many gears as compared with a front derailleur. A typical rear derailleur basically includes a base member, a pair of link members and a movable member with a chain guide. The chain guide is typically pivotally mounted to the movable member. The chain guide typically has a chain cage with a guide pulley and a tension pulley. The link members are pivotally coupled between the base member and the movable member to form a four bar parallelogram linkage. A shift cable is coupled between the base member and one of the link members to move the chain guide laterally with respect to the center plane of the bicycle. Thus, an inner wire of the cable is pulled to move the chain guide in a first lateral direction with respect to the center plane of the bicycle, and released to move the chain guide in a second lateral direction with respect to the center plane of the bicycle.

With this type of rear derailleur, a larger amount of displacement of the inner wire of the shift cable is required for shifting to and from the two end shift positions than for shifting to and from the middle shift positions. Thus, the rider typically must move a shift operating device more for shifting to and from the two end shift positions than for shifting to and from the middle shift positions.

In view of the above, it will be apparent to those skilled in the art from this disclosure that there exists a need for an improved cable operating mechanism. This invention addresses this need in the art as well as other needs, which will become apparent to those skilled in the art from this disclosure.

SUMMARY OF THE INVENTION

One object of the present invention is to provide a cable operating mechanism in which a difference between an amount of angular movement for each a plurality of predetermined wire positions is reduced.

The foregoing objects can basically be attained by providing a cable operating mechanism that basically comprises a fixed member, a wire takeup member, a wire pulling member and a movement transmission member. The wire takeup member is movably mounted with respect to the fixed member about a first pivot axis to move between a plurality of predetermined wire positions. The wire takeup member includes a wire attachment part. The wire pulling member is movably mounted with respect to the fixed member. The movement transmission member is movably mounted with respect to the fixed member about a second pivot axis that is offset from the first pivot axis. The movement transmission member is operatively coupled to the wire pulling member and the wire takeup member such that a movement of the wire pulling member is transmitted to the wire takeup member via the movement transmission member.

These and other objects, features, aspects and advantages of the present invention will become apparent to those skilled in the art from the following detailed description, which, taken in conjunction with the annexed drawings, discloses one preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
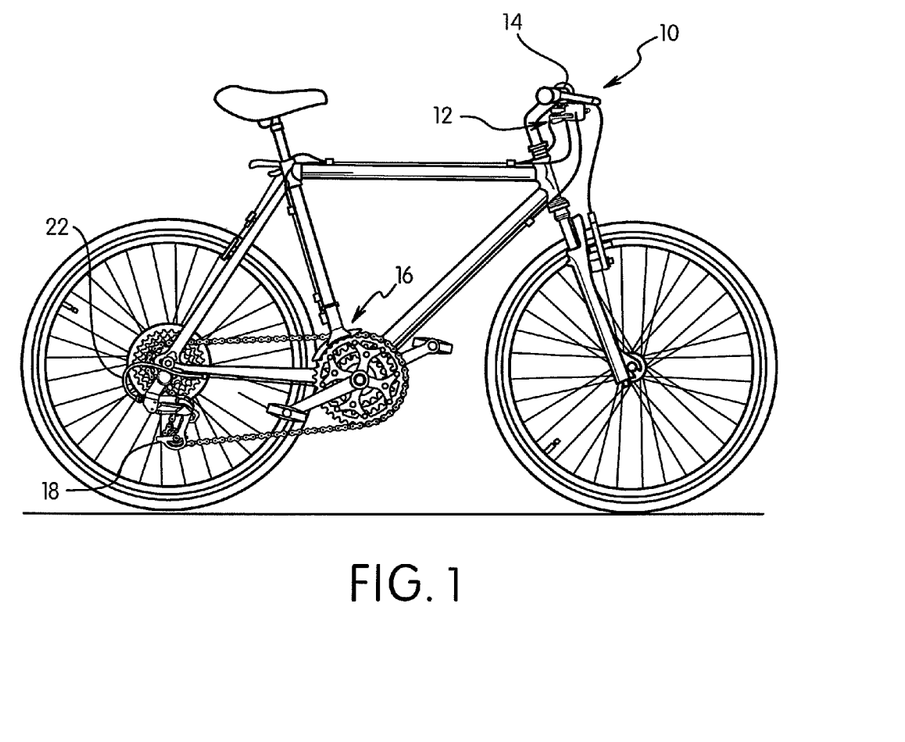
FIG. 1 is a side elevational view of a bicycle equipped with a bicycle control or cable operating mechanism in accordance with one embodiment.
Figure 2:
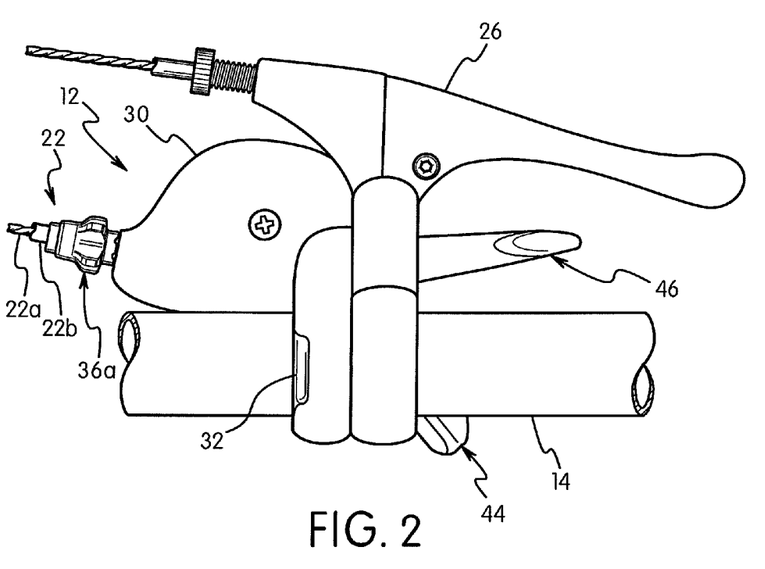
FIG. 2 is a top plan view of the bicycle control or cable operating mechanism mounted to a handlebar of the bicycle.
Figure 3:
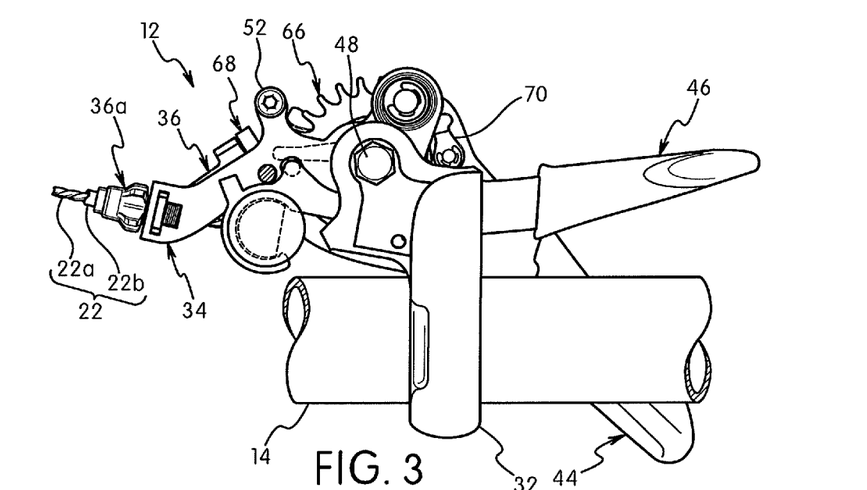
FIG. 3 is a top plan view of the bicycle control or cable operating mechanism illustrated in FIG. 2 with the housing removed.
Figure 4:
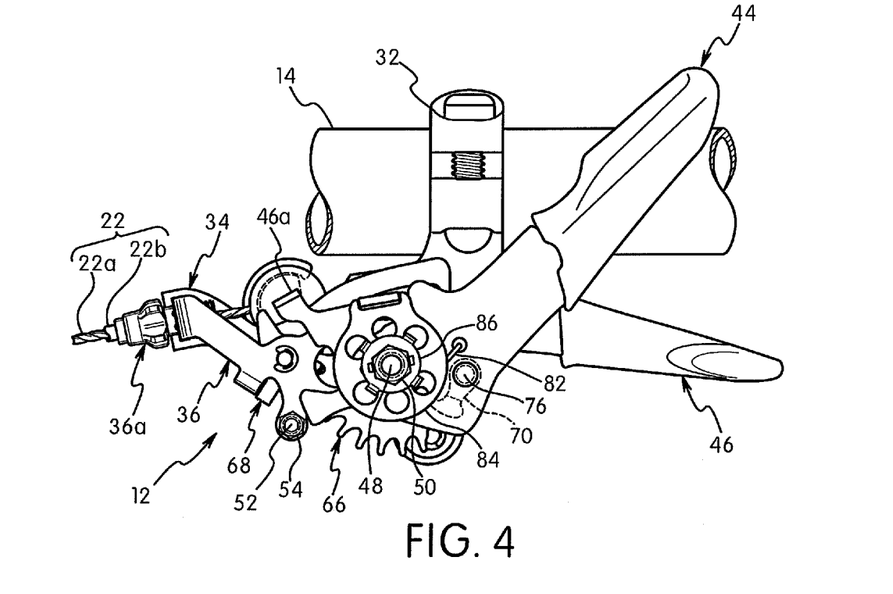
FIG. 4 is a bottom plan view of the bicycle control or cable operating mechanism illustrated in FIGS. 2 and 3 with the housing removed.
Figure 5:
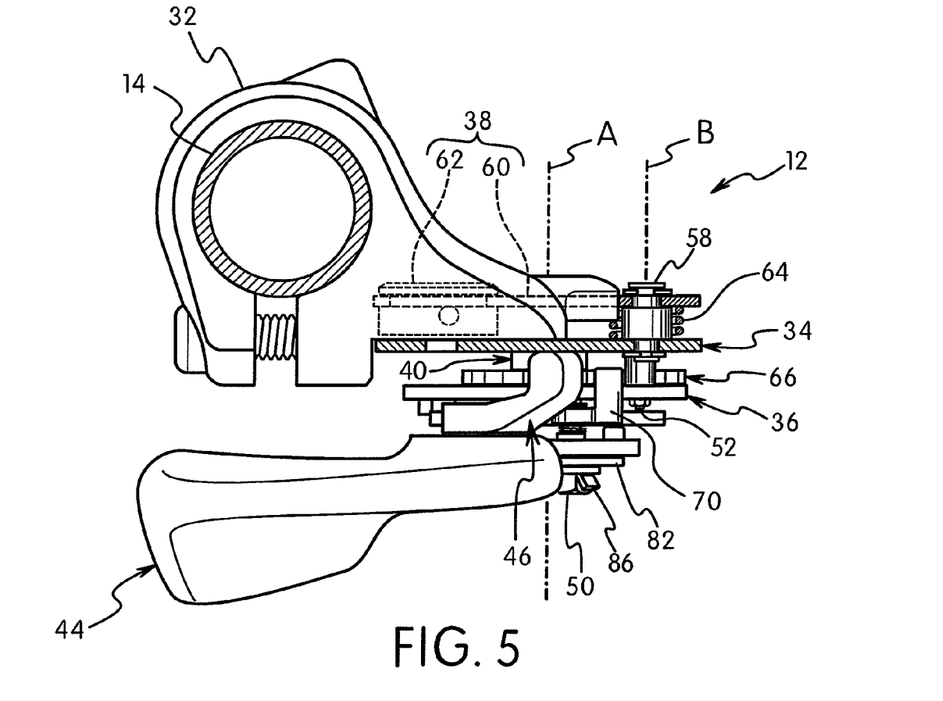
FIG. 5 is an outside elevational view of the bicycle control or cable operating mechanism illustrated in FIGS. 2 to 4 with the housing removed.

Referring initially to FIGS. 1 and 2, a bicycle 10 is illustrated equipped with a bicycle shift operating (control) device 12 in accordance with one embodiment. The bicycle shift operating (control) device 12 constitutes a cable operating mechanism that is preferably used for shifting gears of the bicycle 10. The bicycle shift operating device 12 is mounted on a handlebar 14. In the illustrated embodiment, the bicycle 10 is equipped with a various conventional components, including, but not limited to, a front derailleur 16 and a rear derailleur 18, which are examples of parts of a conventional bicycle drive train. The bicycle shift operating device 12 is a right hand side control device operated by the rider's right hand. Alternatively, the bicycle shift operating device 12 can be mounted on the other side of the handlebar 14 as needed and/or desired.

A shift operating cable 22 operatively connects the bicycle shift operating device 12 to the rear derailleur 18. Preferably, the operating cable 22 is a conventional bicycle control cable that an inner wire 22a with an outer casing 22b covering the inner wire 22a. The rear derailleur 18 can be moved between a plurality (nine) of different gear positions by operation of the bicycle shift operating device 12, which selectively pulls or releases the inner wire 22a of the shift operating cable 22.

As seen in FIG. 2, the bicycle shift operating device 12 is mounted on the handlebar 14 closely adjacent to a brake lever 26 and located on the inward side of the brake lever 26. Preferably, the bicycle shift operating device 12 has a housing 30 for covering the internal parts and a handlebar clamp or bracket 32 for securing the bicycle shift operating device 12 to the handlebar 14. The handlebar clamp 32 is preferably made of, for example, metal and configured to be fastened to the handlebar 14 by tightening a bolt. The housing 30 of the bicycle shift operating device 12 houses the internal parts of the bicycle shift operating device 12, which are discussed below.

As shown in FIGS. 3 to 6, the bicycle shift operating device 12 basically includes an upper support plate 34, a lower support plate 36, a wire takeup member 38, a cam member 40 that constitutes a movement transmission member, a shift positioning mechanism 42, a (shift) pulling lever 44 and a shift release lever 46 and a main support shaft 48. The housing 30, the handlebar clamp 32 and the support plates 34 and 36 basically constitute a support or fixed member of the bicycle shift operating device 12 (i.e., the cable operating mechanism). Basically, the shift pulling lever 44 constitutes a pulling lever of the cable operating mechanism and the shift release lever 46 constitutes a wire releasing member of the cable operating mechanism.

The support plates 34 and 36 are secured together by the main support shaft 48, which is preferably a bolt with a nut 50 threaded on its lower end. Preferably, the main support shaft 48 extends perpendicular to the support plates 34 and 36 and defines a central or main pivot axis A of the shift positioning mechanism 42. The support plates 34 and 36 are also secured together by a bolt 52 and a nut 54. The shaft of the bolt 52 is provided with a spacer 56 for holding the support plates 34 and 36 apart at the appropriate spacing. Thus, the support plates 34 and 36 are mounted on the main support shaft 48 for supporting the shift positioning mechanism 42 on the main support shaft 48.

The lower support plate 36 is preferably provided with a cable adjusting nut 36a for receiving the shift operating cable 22. The cable adjusting nut 36a guides the inner wire 22a of the shift operating cable 22 to the shift positioning mechanism 42. The cable adjusting nut 36a is a conventional structure, and thus, it will not be discussed and/or illustrated in detail.

The wire takeup member 38 is movably mounted with respect to the fixed member (e.g., parts 30, 32, 34 and 36) to the bicycle shift operating device 12 by a pivot pin 58. The pivot pin 58 is fixedly mounted to the support plate 34. The pivot pin 58 defines a pivot axis B for pivotally supporting the wire takeup member 38. The pivot axis B of the wire takeup member 38 is offset (e.g., the offset is about eight millimeters) from the main pivot axis A of the shift positioning mechanism 42. The pivot axis B can be considered a first pivot axis and the main pivot axis A can be considered a second pivot axis, or vice-a-versa, as needed and/or desired. In any event, the wire takeup member 38 is pivotally mounted on the pivot pin 58 to pivot with respect to the fixed member (e.g., parts 30, 32, 34 and 36) such that the wire takeup member 38 can move in both a wire pulling direction for pulling the inner wire 22a of the shift operating cable 22 and a wire releasing direction for releasing the inner wire 22a of the shift operating cable 22.

Preferably, the wire takeup member 38 includes a mounting arm part 60 and a wire attachment part 62. The mounting arm part 60 is preferably a hard rigid member formed of a suitable rigid material such as a metal plate material. The wire attachment part 62 is a metal barrel shaped member that is preferably a hard rigid member formed of a suitable rigid material such as a cast metal material. The mounting arm part 60 and the wire attachment part 62 are fixed together to move as an integral unit when in their installed operating positions.

Figure 6:
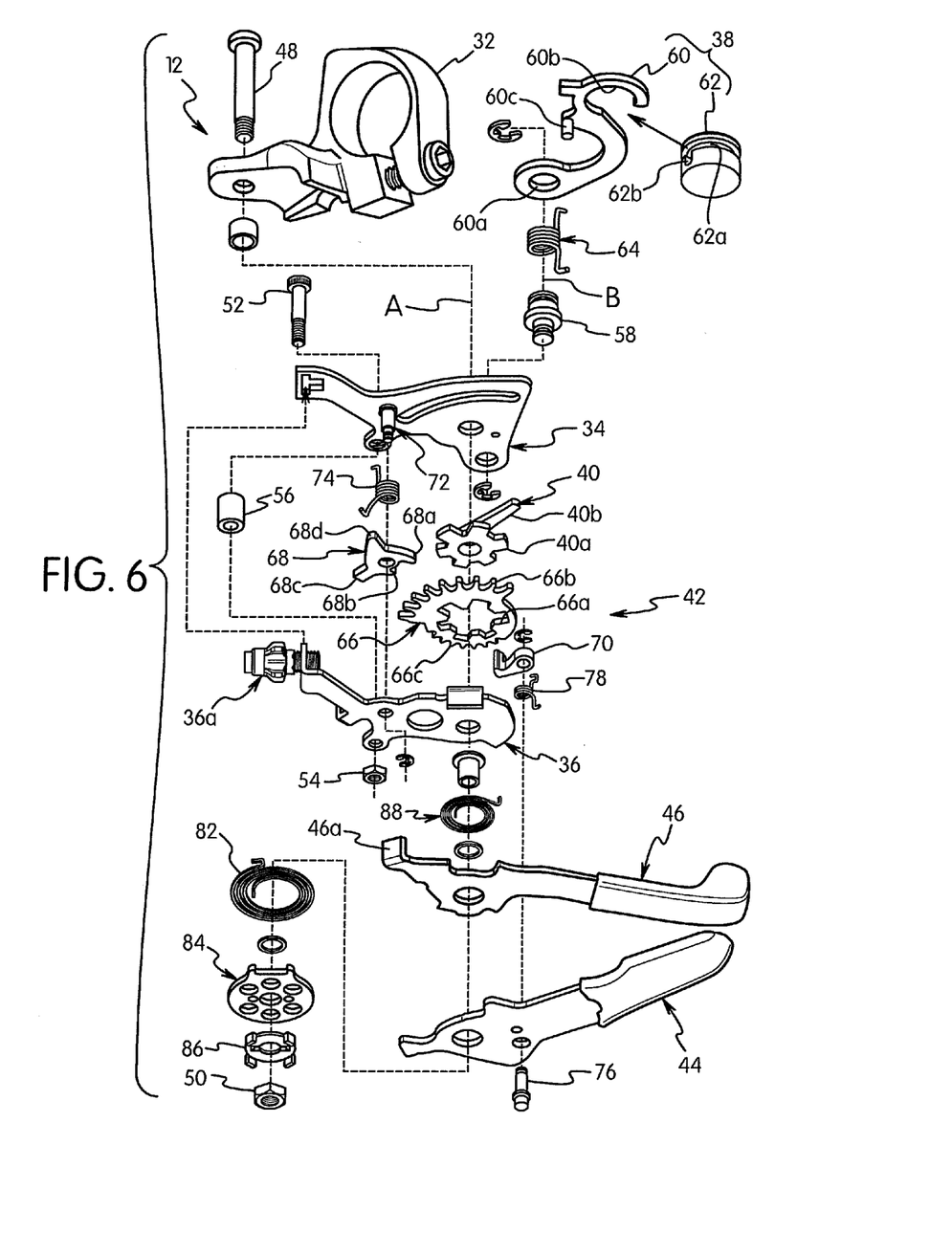
FIG. 6 is a simple exploded perspective view of selected part of the bicycle control or cable operating mechanism in accordance with the illustrated embodiment.
Figure 7:
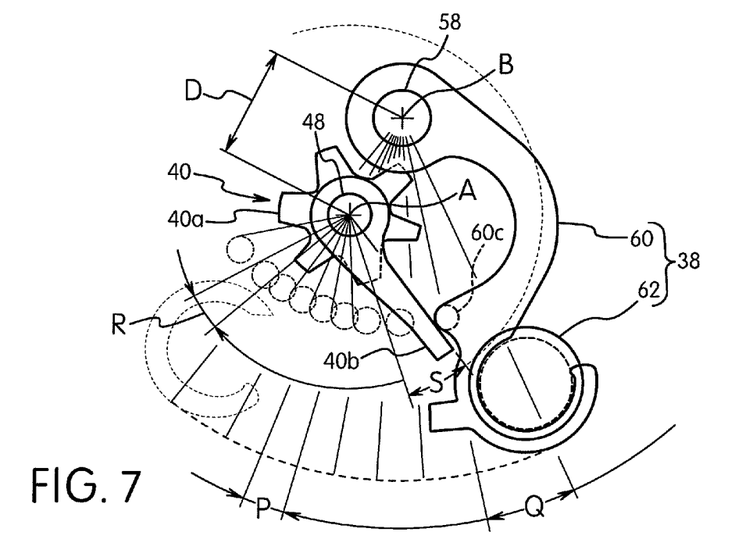
FIG. 7 is a diagrammatic top plan view of the wire takeup member and the movement transmission member in the fully pulled position.
Figure 8:
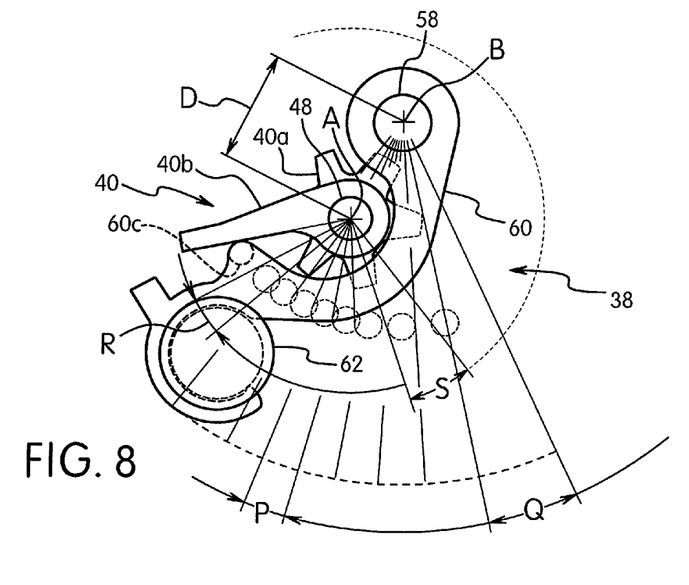
FIG. 8 is a diagrammatic top plan view of the wire takeup member and the movement transmission member in the fully released position.
Figure 9:
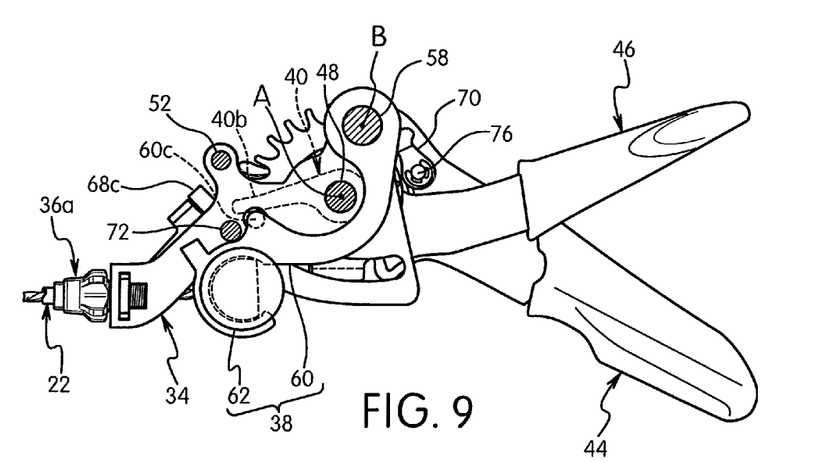
FIG. 9 is a top plan view of selected parts of the cable operating mechanism shown in a neutral or rest position with the wire takeup member and the movement transmission member in the fully released position.

As best seen in FIG. 6, a spring member 64 (e.g., a torsional coil spring) is provided between the support plate 34 and the wire takeup member 38 to spring load the wire takeup member 38 in the wire releasing direction (clockwise in FIGS. 7 and 8). In particular, one end of the spring member 64 is hooked on the wire takeup member 38 and the other end is hooked on the upper support plate 34. Thus, the biasing force of the spring member 64 causes the wire takeup member 38 to rotate about the pivot axis B during a wire releasing operation. Also, the rear derailleur 18 is typically provided with a biasing member that also applies a pulling force on the inner wire 22a which in turn urges the wire takeup member 38 in the wire releasing direction (clockwise in FIGS. 7 and 8).

In the illustrated embodiment, as seen in FIG. 6, the mounting arm part 60 has a pivot hole 60a at one end and an opening 60b at the other end. The pivot pin 58 is disposed in the pivot hole 60a so that the mounting arm part 60 is pivotally mounted on the pivot pin 58. The opening 60b is configured to support the wire attachment part 62 on the mounting arm part 60. The mounting arm part 60 of the wire takeup member 38 also has an engaging protrusion or abutment member 60c that is fixed thereto. In the illustrated embodiment, the abutment member 60c is formed as a rigid pin that projects downwardly from a lower surface of the plate of the mounting arm part 60 and through a slot in the upper support plate 34 where the abutment member 60c contacts the cam member 40. The abutment member 60c is biased into sliding contact with the cam member 40 by the spring member 64. Thus, the biasing force of the spring member 64 is transmitted to the cam member 40 such that the cam member 40 rotates together with the wire takeup member 38 during a wire releasing operation.

The wire attachment part 62 is configured for attaching the inner wire 22a thereto. The wire attachment part 62 can be integrally formed with the mounting arm part 60 if needed and/or desired. Alternatively, the wire attachment part 62 can be a separate member that is attached to the mounting arm part 60 as shown. Thus, the precise construction will not be discussed in detail herein. Rather, only a brief description of the connection between the mounting arm part 60 and the wire attachment part 62 will be discussed with respect to the illustrated embodiment.

In the illustrated embodiment, the wire attachment part 62 has a reduced area forming a groove 62a between the axial ends of the wire attachment part 62. This groove 62 of the wire attachment part 62 is receiving the opening 60b in the mounting arm part 60 of the wire takeup member 38. The reduced area forming the groove 62a has a first transverse width that allows the reduced area of the wire attachment part 62 to be inserted into the opening 60b in the mounting arm part 60 when in a first orientation, and a second transverse width that prevents removal of the wire attachment part 62 from the opening 60b in the mounting arm part 60 when in a second orientation (i.e., the normal in use position). The wire attachment part 62 also has a bore 62b for attaching the inner wire 22a.

As best seen in FIGS. 6 to 8, the cam member 40 includes an attachment portion 40a and a camming portion 40b. The attachment portion 40a of the cam member 40 is pivotally mounted on the main support shaft 48 to rotate about the pivot axis A. In particular, the attachment portion 40a has a center pivot hole for pivotally receiving the main support shaft 48. The attachment portion 40a of the cam member 40 has a non circular peripheral surface that engages a part of the shift positioning mechanism 42, as discussed below, so that the movement of the cam member 40 is controlled by the shift positioning mechanism 42. The camming portion 40b of the cam member 40 is an arm shaped member that extends radially from the attachment portion 40a of the cam member 40. The camming portion 40b of the cam member 40 slidably contacts the abutment member 60c of the wire takeup member 38. The camming portion 40b of the cam member 40 (movement transmission member) and the abutment member 60c of the wire takeup member 38 constitute a movement transmitting arrangement.

Referring to FIGS. 7 and 8, the relationship between the wire takeup member 38 and the cam member 40 will now be discussed. Generally, the amount of movement for each gear position of the rear derailleur 18 directly corresponds to the amount of angular displacement of the wire takeup member 38. However, due to the sliding contact between the wire takeup member 38 and the cam member 40, the amount of angular displacement of the cam member 40 does not directly correspond to the amount of angular displacement of the wire takeup member 38 or the amount of movement for each gear position of the rear derailleur 18. The wire takeup member 38 has a plurality of predetermined wire positions that corresponds to the predetermined gear positions, respectively, but with the amount of angular displacement of the wire takeup member 38 differs from the amount of angular displacement of the cam member 40. Thus, the wire takeup member 38 is movably mounted with respect to the fixed member about the first pivot axis B to move between the plurality of predetermined wire positions. On the other hand, the cam member 40 has a plurality of predetermined cam positions that corresponds to the predetermined gear positions of the rear derailleur 18, respectively. In particular, the wire takeup member 38 has an angular displacement that is smaller than an angular displacement of the cam member 40 as the cam member 40 and the wire takeup member 38 pivot about the pivot axes A and B, respectively. As can be seen in FIGS. 7 and 8, the camming portion 40b of the cam member 40 has first and second lateral sides, with only the first lateral side of the camming portion 40b (the right side in FIGS. 7 and 8) contacting the wire takeup member 38 between each of the predetermined wire positions of the wire takeup member 38. As a result, a triangle is formed by the pivot axis B, the main pivot axis A, and a point of contact between the wire takeup member 38 and the cam member 40. This triangle has an internal angle at the main pivot axis A that is always obtuse throughout the predetermined wire positions of the wire takeup member 38. It can also be understood from FIGS. 7 and 8 that the pivot axis B and the main pivot axis A are disposed with a plane extending through both the pivot axis B and the main pivot axis A. Furthermore, a point of contact between the wire takeup member 38 and the cam member 40 is located on a first side of the plane at a first of the predetermined wire positions representing a fully released position of the wire takeup member 38 (FIG. 8), and the point of contact is located on a second, opposite side of the plane at a last of the predetermined wire positions representing a fully pulled position of the wire takup member 38 (FIG. 7).

For example, in the illustrated embodiment, in the case of shifting from the first gear position to the second gear position, the angular displacement of the wire takeup member 38 from the first wire position (fully pulled) to the second wire position is 12° 26', while the angular displacement of the cam member 40 from the first cam position (fully pulled) to the second cam position is 18° 33'. In the case of shifting from the second gear position to the third gear position, the angular displacement of the wire takeup member 38 is 8° 3' and the angular displacement of the cam member 40 is 15° 2'. In the case of shifting from the third gear position to the fourth gear position, the angular displacement of the wire takeup member 38 is 7° 2' and the angular displacement of the cam member 40 is 12° 9'. In the case of shifting from the fourth gear position to the fifth gear position, the angular displacement of the wire takeup member 38 is 6° 7' and the angular displacement of the cam member 40 is 12° 7'. In the case of shifting from the fifth gear position to the sixth gear position, the angular displacement of the wire takeup member 38 is 6° 2' and the angular displacement of the cam member 40 is 13° 5'. In the case of shifting from the sixth gear position to the seventh gear position, the angular displacement of the wire takeup member 38 is 6° 1' and the angular displacement of the cam member 40 is 14° 2'. In the case of shifting from the seventh gear position to the eighth gear position, the angular displacement of the wire takeup member 38 is 6° 3' and the angular displacement of the cam member 40 is 12° 4'. In the case of shifting from the eighth gear position to the ninth gear position, the angular displacement of the wire takeup member 38 is 10° 3' and the angular displacement of the cam member 40 is 16° 8'. In the illustrated embodiment, the wire takeup member 38 has a different amount angular displacement for changing between some of the predetermined wire positions than for others of the predetermined wire positions. Likewise, the cam member 40 has a different amount angular displacement for changing between some of a plurality of predetermined cam positions than for others of the predetermined cam positions. Accordingly, in the illustrated embodiment, the angular displacements of the wire takeup member 38 and the cam member 40 are non-linear.

In the illustrated embodiment, the wire takeup member 38 has a greater amount angular displacement for changing between each end position of the predetermined wire positions and an adjacent end position than for changing between the predetermined wire positions between two intermediate positions between the end positions. Similarly, the cam member 40 has a greater amount angular displacement for changing between each end position of the predetermined cam positions and an adjacent end position than for changing between the predetermined cam positions between two intermediate positions between the end positions.

Moreover, in the illustrated embodiment, the wire takeup member 38 has a minimum amount of angular displacement P (e.g., 6° 1') corresponding to a displacement between a first pair of the predetermined wire positions (e.g., between the sixth and seventh wire positions) and a maximum amount of angular displacement Q (e.g., 12° 26') corresponding to a displacement between a second pair of the predetermined wire positions (e.g., between the first and second wire positions). Also, in the illustrated embodiment, the cam member 40 has a minimum amount of angular displacement R (e.g., 12° 4') corresponding to a displacement between a first pair of a plurality of cam predetermined positions (e.g., between the seventh and eighth cam positions) and a maximum amount of angular displacement S (e.g., 18° 33') corresponding to a displacement between a second pair of the predetermined cam positions (e.g., between the first and second cam positions). Thus, a ratio of the maximum amount of angular displacement to the minimum amount of angular displacement for the cam member 40 (e.g., the ratio 18° 33' to 12° 26') is smaller than a ratio of the maximum amount of angular displacement to the minimum amount of angular displacement for the wire takeup member 38 (e.g., the ratio 12° 26' to 6° 1').

Still referring to FIG. 6, the shift positioning mechanism 42 basically includes a positioning element or plate 66, a position maintaining element or pawl 68, and a pulling element or pawl 70. Generally speaking, the shift positioning mechanism 42 is operatively coupled between the wire takeup member 38 and the lever 44 and 46 to selectively maintain the wire takeup member 38 in one of the plurality of predetermined wire positions. More specifically, the shift pulling lever 44 is operatively coupled to the positioning plate 66 of the shift positioning mechanism 42 by the pulling pawl 70 such that pivotal movement of the shift pulling lever 44 in a first rotational direction (counterclockwise in FIGS. 7 to 16) causes the wire takeup member 38 to rotate in the first rotational direction (counterclockwise in FIGS. 7 to 16) from a current shift position to a subsequent shift position with the shift positioning mechanism 42 holding the wire takeup member 38 in the subsequent shift position. The shift release lever 46 is operatively coupled to the position maintaining pawl 68 of the shift positioning mechanism 42 such that movement of the shift release lever 46 in a second rotational direction (clockwise in FIGS. 7 to 16) causes the wire takeup member 38 to rotate (clockwise in FIGS. 7 to 16) from a current shift position to a subsequent shift position with the shift positioning mechanism 42 holding the wire takeup member 38 in the subsequent shift position.

The positioning plate 66 is rotatably mounted between the upper and lower support plates 34 and 36 by the main support shaft 48 to rotate about the (second) pivot axis A between a plurality of predetermined positions. In other words, the positioning plate 66 is pivotally mounted with respect to the fixed member (e.g., parts 30, 32, 34 and 36) about the (second) pivot axis A to move between the plurality of predetermined positions that is offset from the (first) pivot axis B. The positioning plate 66 is a ratchet plate that has an non-circular engaging hole 66a that mates with the attachment portion 40a of the cam member 40 such that the positioning plate 66 moves integrally as a unit with the cam member 40. Thus, the cam member 40 (movement transmission member) is movably mounted with respect to the fixed member (e.g., parts 30, 32, 34 and 36) about the second pivot axis A that is offset from the first pivot axis B. The cam member 40 (movement transmission member) is operatively coupled to the pulling pawl 70 (wire pulling member 70) and the wire takeup member 38 such that a movement of the pulling pawl 70 (wire pulling member 70) is transmitted to the wire takeup member 38 via the cam member 40 (movement transmission member). The positioning plate 66 includes an outer peripheral edge with a plurality of positioning teeth 66b selectively engagable with the position maintaining pawl 68 and a plurality of pulling teeth 66c selectively engagable with the pulling pawl 70. The positioning teeth 66b and the pulling teeth 66c are configured and arranged to form nine predetermined positions of the positioning plate 66, the cam member 40 and the wire takeup member 38. The size of the spaces between the positioning teeth 66b and the pulling teeth 66c is determined based on the amount of cable movement required to achieve the shift positions of the rear derailleur 18.

As best seen in FIGS. 10 to 16, the position maintaining pawl 68 is pivotally mounted between the upper and lower support plates 34 and 36 by a pivot shaft 72. The pivot shaft 72 protrudes from the bottom surface of the upper support plate 34. The position maintaining pawl 68 is spring loaded by a spring member 74 (e.g., a torsional coil spring) in the counterclockwise direction of FIGS. 9 to 16. Thus, the position maintaining pawl 68 is movably arranged with respect to the upper and lower support plates 34 and 36 to move between a position holding state (FIGS. 10, 12, 14 and 16) that holds the positioning plate 66 in one of the predetermined positions and a position releasing state (FIGS. 11 and 15) that releases the positioning plate 66 for rotational movement of the positioning plate 66.

Preferably, the position maintaining pawl 68 has a stop tooth 68a, an over-rotation preventing tooth 68b, a stop projection 68c and an actuating projection 68d. Generally speaking, the stop tooth 68a and the over-rotation preventing tooth 68b selectively and alternately engage one of the positioning teeth 66b in response to pivotal movement of the shift release lever 46. The stop projection 68c protrudes outwardly in a radial direction from an outer peripheral edge of the position maintaining pawl 68 for contacting an abutment on the lower support plate 36 to maintain the position maintaining pawl 68 in the position holding state or rest position. In particular, the spring member 74 urges the position maintaining pawl 68 in the counterclockwise direction of FIGS. 9 to 16 such that the stop projection 68c of the position maintaining pawl 68 contacts the abutment on the lower support plate 36 to maintain the position maintaining pawl 68 in the position holding state. The actuating projection 68d protrudes outwardly in a radial direction from an outer peripheral edge of the position maintaining pawl 68 such that the pivotal movement of the shift release lever 46 contacts the actuating projection 68d to rotate the position maintaining pawl 68 from the position holding state to the position releasing state.

Figure 10:
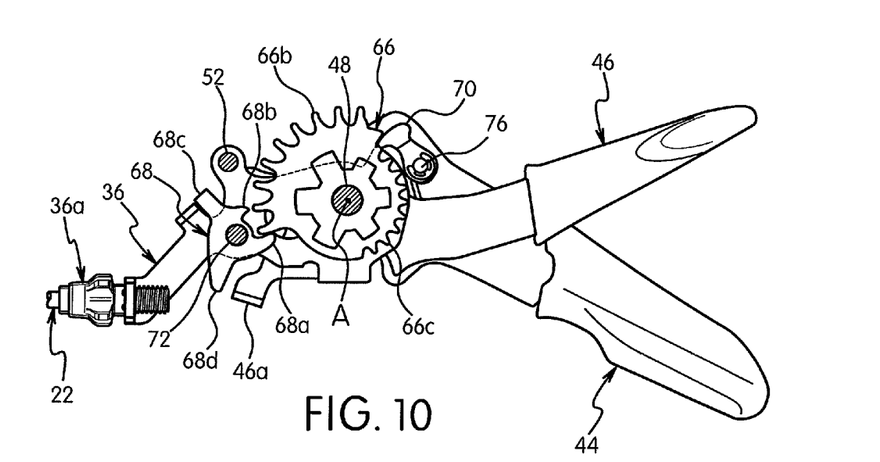
FIG. 10 is a top plan view of selected parts of the cable operating mechanism shown in a neutral or rest position with the wire takeup member and the movement transmission member removed.
Figure 11:
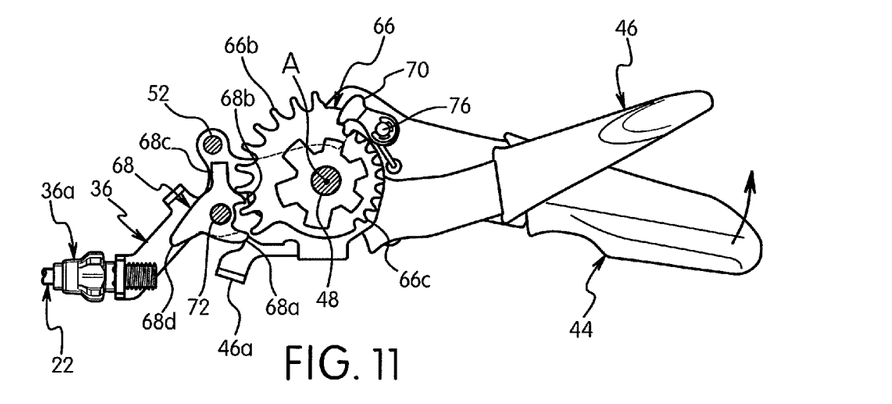
FIG. 11 is an enlarged top plan view, similar to FIG. 10, of selected parts of the cable operating mechanism illustrating the pulling lever being moved to a wire pulled position during a shifting operation from the position of FIG. 9.
Figure 14:
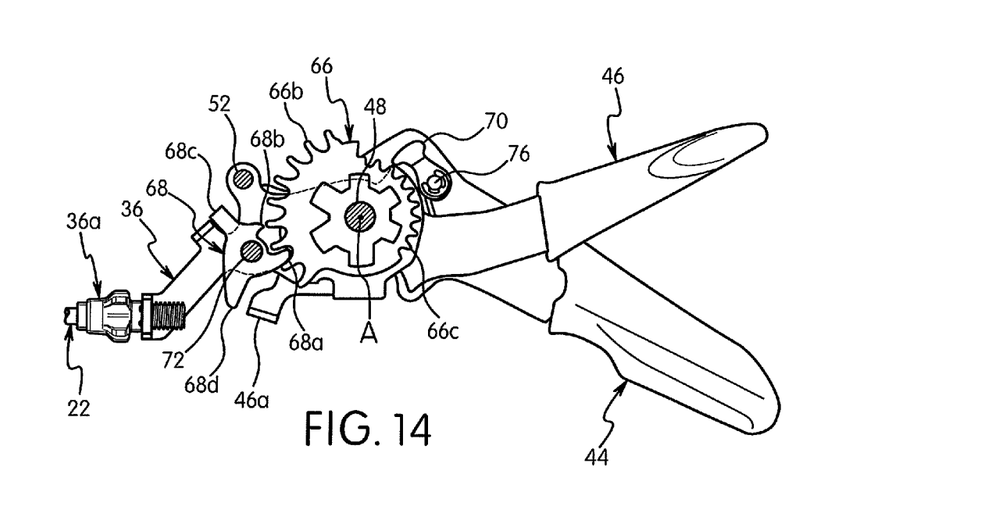
FIG. 14 is a top plan view of selected parts of the cable operating mechanism shown in a neutral or rest position with the wire takeup member and the movement transmission member removed.
Figure 15:
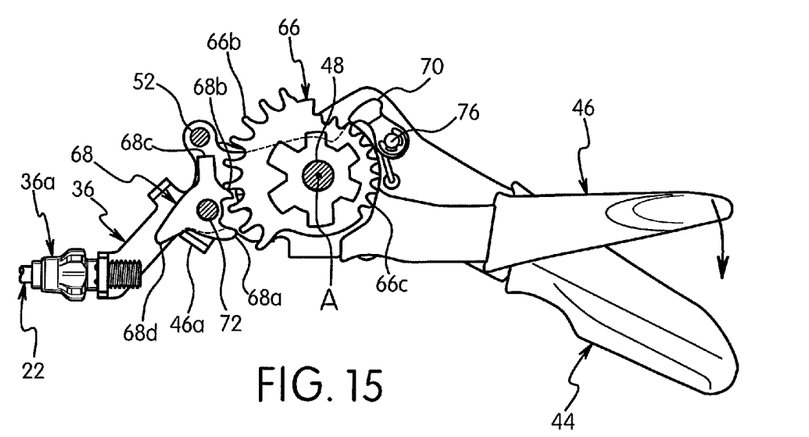
FIG. 15 is an enlarged top plan view, similar to FIG. 14, of selected parts of the cable operating mechanism illustrating the release lever being moved to a releasing position during a shifting operation from the position of FIG. 14.

The position maintaining pawl 68 is configured to move in the same plane as the positioning plate 66 such that the stop tooth 68a and the over-rotation preventing tooth 68b selectively and alternately engages one of the positioning teeth 66b in response to pivotal movement of the shift release lever 46. In particular, with the shift release lever 46 in the rest position, the position maintaining pawl 68 is biased to the position holding state in which the stop tooth 68a engages one of the positioning teeth 66b and the over-rotation preventing tooth 68b is spaced from the positioning teeth 66b as seen in FIGS. 10, 12, 14 and 16. Thus, the stop tooth 68a of the position maintaining pawl 68 contacts one of the positioning teeth 66b to stop rotation of the positioning plate 66 (which is spring loaded in the counterclockwise direction of FIGS. 9 to 16) in the wire release direction. When the shift release lever 46 is moved from the rest position to the releasing position, the position maintaining pawl 68 is moved to the position releasing state in which the stop tooth 68a disengages from the positioning teeth 66b and the over-rotation preventing tooth 68b engages one of the positioning teeth 66b to temporarily hold the positioning plate 66 in an intermediate position as seen in FIGS. 11 and 15. In other words, the over-rotation preventing tooth 68b is configured to move between a non-contact position where it does not contact one of the positioning teeth 66b and a contact position where it contacts one of the positioning teeth 66b at a different position than the stop tooth 68a during the wire releasing operation. When the over-rotation preventing tooth 68b moves to the contact position by the shift release lever 46, the over-rotation preventing tooth 68b contacts one of the positioning teeth 66b located one tooth downstream in the release direction from one of the positioning teeth 66b that the position maintaining pawl 68 was contacting, thereby preventing the positioning plate 66 from continuing to rotate in the wire release direction after the position maintaining pawl 68 separates from one of the positioning teeth 66b. When the over-rotation preventing tooth 68b is in the contact position, the stop tooth 68a of the position maintaining pawl 68 is arranged in a position located beyond one of the positioning teeth 66b that it was originally engaged with.

As seen in FIGS. 6 to 16, the pulling pawl 70 is provided on the shift pulling lever 44 such that movement of the shift pulling lever 44 causes the pulling pawl 70 to selectively engage one of the pulling teeth 66c of the positioning plate 66 for rotating the positioning plate 66. Thus, the pulling pawl 70 (e.g., a wire pulling member) is movably mounted with respect to the fixed member to drive the positioning plate 66, the cam member 40 and the wire takeup member 38 in a wire pulling direction. In particular, the pulling pawl 70 is pivotally mounted on a pivot pin 76 that is fixed to the shift pulling lever 44. Thus, the pulling pawl 70 is movably arranged with respect to the shift pulling lever 44 to move between a disengaged or rest position and a pulling position. In the pulling position, the tooth of the pulling pawl 70 engages one of the pulling teeth 66c. In the disengaged or rest position, the tooth of the pulling pawl 70 is separated from the pulling teeth 66c. A spring member 78 (e.g., a torsional coil spring) is provided on the pivot pin 76 with one end of the spring member 78 engaged with the shift pulling lever 44 and the other end of the spring member 78 engaged with the pulling pawl 70. The spring member 78 biases the pulling pawl 70 towards the positioning plate 66. In other words, the pulling pawl 70 is spring loaded in the counterclockwise direction in FIGS. 9 to 16 by the spring member 78. However, when the pulling pawl 70 is in the rest position, the tooth of the pulling pawl 70 rests on the edge of the lower support plate 36. When the shift pulling lever 44 is moved in the first rotational direction (wire pulling direction), the tooth of the pulling pawl 70 rides off the edge of the lower support plate 36 to engage one of the pulling teeth 66c. The number of positioning teeth 66b and the number of the pulling teeth 66c corresponds to the number of shift positions of the rear derailleur 18 and the teeth 66b and 66c are configured to protrude radially outward from an external circumferential surface of the positioning plate 66. Together with the wire takeup member 38, the positioning plate 66 is spring loaded in the wire release direction (clockwise from a top plan view) by the spring member 64.

As mentioned above, the shift pulling lever 44 supports the pulling pawl 70, which constitutes the wire pulling member. Thus, the shift pulling lever 44 is an operating member that has a cable pulling function for operating a typical gear changer device (e.g., the rear derailleur). As seen in FIGS. 10 and 11, the shift pulling lever 44 is rotatably mounted on the main support shaft 48 such that it can pivot freely between a rest or start position shown in FIG. 10 and an operation end position by pivoting counterclockwise from the rest or start position. The shift pulling lever 44 is operatively coupled to the shift positioning mechanism 42 to change a current position of the wire takeup member 38. The shift pulling lever 44 is preferably a trigger lever that returns to a rest position after being moved to an operating position to change the current position of the wire takeup member 38. In particular, the shift pulling lever 44 is spring loaded toward the rest position by a spring member 82 (e.g., a spiral spring). The spring member 82 has one end engaged with the shift pulling lever 44 and the other end engaged with a retaining plate 84, which is provided on the end of the main support shaft 48 between the nut 50 and the shift pulling lever 44. The retaining plate 84 contacts a flange of the lower support plate 36 to prevent rotation of the retaining plate 84 about the main support shaft 48. Preferably, a nut plate 86 is also provided on the end of the main support shaft 48 between the nut 50 and the retaining plate 84. The nut 50 is threaded on the lower end of the main support shaft 48 to retain the shift pulling lever 44, the shift release lever 46, the retaining plate 84 and nut plate 86 on the main support shaft 48 below the lower support plate 36.

The shift release lever 46 is a release member having a wire release function for operating a typical gear changer device (e.g., the rear derailleur 18). The shift release lever 46 is rotatably mounted on the main support shaft 48 with respect to the fixed member (e.g., parts 30, 32, 34 and 36). The shift release lever 46 is configured to engage the shift positioning mechanism 42 to release the wire takeup member 38 so that it can rotate due to the force of the spring member 64. Specifically, the shift release lever 46 has a movement transmitting protrusion or release abutment 46a that has been formed by bending a distal end of the shift release lever 46. The release abutment 46a is an integral part of the shift release lever 46, which is pivotally mounted on the pivot axis A. The release abutment 46a engages the actuating projection 68d of the position maintaining pawl 68 when the shift release lever 46 is pivoted from the rest position to the releasing position to release the wire takeup member 38 for rotation in under the urging force of the spring member 64.

Preferably, the shift release lever 46 is a trigger lever that returns to the rest position after being moved to the operating or releasing position to change the current position of the wire takeup member 38. In particular, the shift release lever 46 is spring loaded toward the rest position by a spring member 88 (e.g., a torsional coil spring), which has a first end coupled to the lower support (member) plate 36 and a second end coupled to the shift release lever 46.

The operation of the shift positioning mechanism 42 of bicycle shift operating device 12 in order to shift gears will now be explained with reference to FIGS. 10 to 12. First, an operation of pulling the shift operating cable 22 will be explained.

Figure 12:
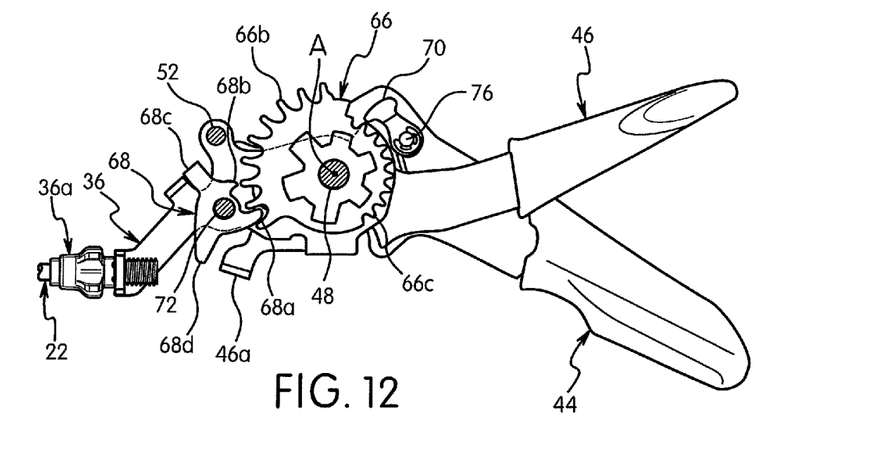
FIG. 12 is an enlarged top plan view, similar to FIGS. 10 and 11, of selected parts of the cable operating mechanism illustrating the pulling lever returned to the neutral or rest position from the shifting operation of FIG. 11.
Figure 13:
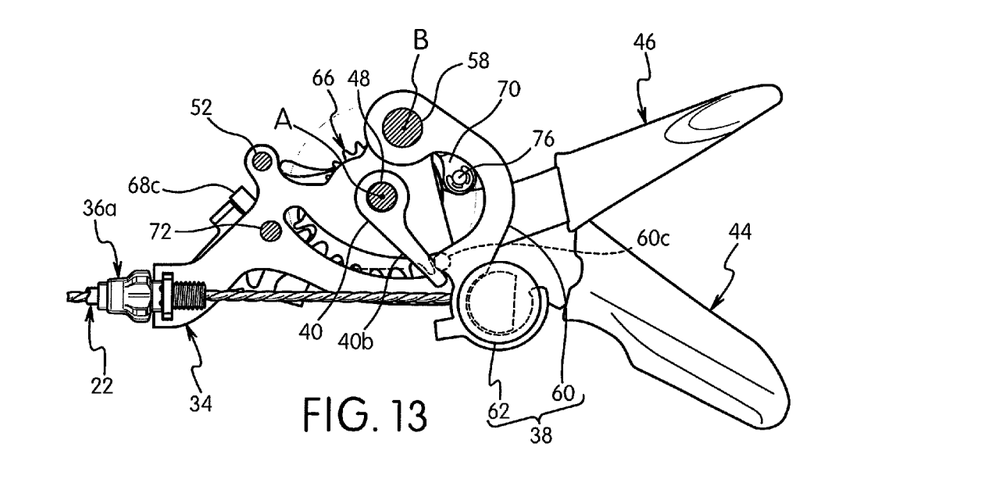
FIG. 13 is a top plan view of selected parts of the cable operating mechanism shown in a neutral or rest position with the wire takeup member and the movement transmission member in the fully pulled position.

As shown in FIG. 10 and 12, the rest position is shown in which neither the shift pulling lever 44 nor the shift release lever 46 has been operated. In FIG. 10, the rear derailleur 18 is in a ninth (top) position, i.e., the position corresponding to the gear having the smallest tooth count, and the wire takeup member 38 is in the ninth predetermined wire position. If, from the state shown in FIG. 10, a rider presses the shift pulling lever 44 with a right thumb and moves the shift pulling lever 44, from the start or rest position toward the end position, then the pulling pawl 70 will contact one of the pulling teeth 66c of the positioning plate 66 and the positioning plate 66 and the cam member 40 will be pivoted together in the wire pulling direction, i.e., the counterclockwise direction of FIGS. 10 to 12. This pivotal movement of the positioning plate 66 also causes the cam member 40 to pivot the wire takeup member 38. The pivotal movement of the wire takeup member 38 causes the inner wire 22a to be pulled such that the rear derailleur 18 moves toward an intermediate position corresponding to a larger gear, i.e., a gear having a larger diameter. During this movement, as shown in FIG. 11, the position maintaining pawl 68 is moved by one of the positioning teeth 66b engaging the stop tooth 68a to rotate the position maintaining pawl 68 such that the position maintaining pawl 68 pivots in the clockwise direction. When the shift pulling lever 44 has been pivoted towards the end position and released, the shift pulling lever 44 returns to the start or rest position as shown in FIG. 12 due to the spring load of the spring member 82 and the positioning plate 66 is positioned due to the engagement of the position maintaining pawl 68 with the positioning teeth 66b.

Figure 16:
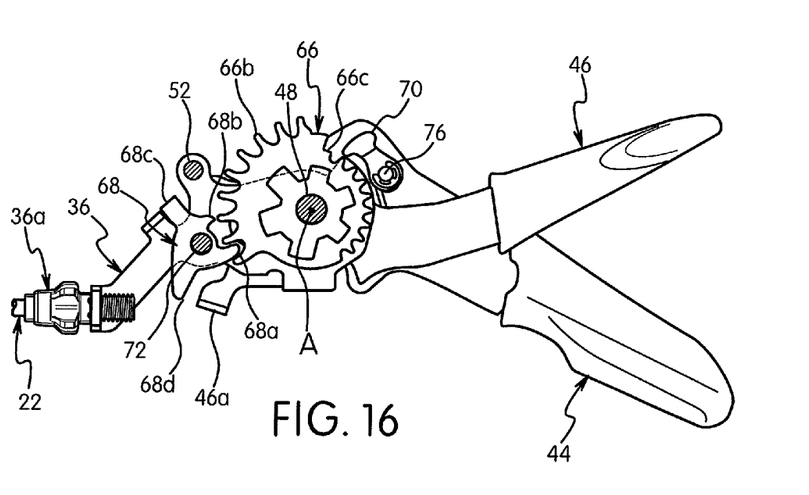
FIG. 16 is an enlarged top plan view, similar to FIGS. 14 and 15, of selected parts of the cable operating mechanism illustrating the release lever returned to the neutral or rest position after the shifting operation of FIG. 15.

Now an operation of releasing the shift operating cable 22 will be explained with reference to FIGS. 14 to 16. If, from the position shown in FIG. 14, the shift release lever 46 is moved clockwise direction, this movement of the shift release lever 46 causes the release abutment 46a of the shift release lever 46 to contact the actuating projection 68d to rotate the position maintaining pawl 68 in a clockwise direction. As a result, the over-rotation preventing tooth 68b is moved in between two of the positioning teeth 66b to prevent the positioning plate 66 from rotating to far under the force of the spring member 64. Thus, when the position maintaining pawl 68 pivots clockwise, the stop tooth 68a of the position maintaining pawl 68 separates from one of the positioning teeth 66b and the positioning plate 66 rotates counterclockwise together with the cam member 40 in the wire releasing direction. This pivotal movement of the positioning plate 66 also causes the cam member 40 to pivot the wire takeup member 38. The pivotal movement of the wire takeup member 38 causes the inner wire 22a to be released such that the rear derailleur 18 moves to the next gear. When the positioning plate 66 rotates in the wire releasing direction, the over-rotation preventing tooth 68b of the position maintaining pawl 68 contacts one of the positioning teeth 66b located one tooth away from one of the positioning teeth 66b and the positioning plate 66 stops rotating. When the rider releases the shift release lever 46, the shift release lever 46 returns to the rest position as shown in FIG. 16 due to the spring force of the spring member 88. The position maintaining pawl 68 then rotates counterclockwise due to the spring member 74 and the over-rotation preventing tooth 68b separates from one of the positioning teeth 66b, causing the positioning plate 66 to rotate counterclockwise again. However, the stop tooth 68a of the position maintaining pawl 68 contacts the positioning teeth 66b and causes the positioning plate 66, the cam member 40 and the wire takeup member 38 to be positioned.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the cable operating mechanism. Accordingly, these terms, as utilized to describe the cable operating mechanism should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cable operating mechanism comprising:
a fixed member;
a wire takeup member movably mounted with respect to the fixed member about a first pivot axis to move between a plurality of predetermined wire positions, the wire takeup member including a wire attachment part;
a wire pulling member movably mounted with respect to the fixed member; and
a movement transmission member movably mounted with respect to the fixed member about a second pivot axis that is offset from the first pivot axis, the movement transmission member being operatively coupled to the wire pulling member and the wire takeup member such that a movement of the wire pulling member is transmitted to the wire takeup member via the movement transmission member, the movement transmission member having a camming portion with first and second lateral sides, with only the first lateral side of the camming portion contacting the wire takeup member between each of the predetermined wire positions such that a triangle that is formed by the first pivot axis, the second pivot axis, and a point of contact between the wire takeup member and the movement transmission member, the triangle having an internal angle at the second pivot axis that is always obtuse throughout the predetermined wire positions.

2. The cable operating mechanism according to claim 1, wherein the wire takeup member has an angular displacement that is smaller than an angular displacement of the movement transmission member as the wire takeup member and the movement transmission member pivot about the first and second axes, respectively.

3. The cable operating mechanism according to claim 1, wherein the wire takeup member has a minimum amount of angular displacement corresponding to a displacement between a first pair of the predetermined wire positions and a maximum amount of angular displacement corresponding to a displacement between a second pair of the predetermined wire positions, and the movement transmission member has a minimum amount of angular displacement corresponding to a displacement between a first pair of a plurality of predetermined positions and a maximum amount of angular displacement corresponding to a displacement between a second pair of the predetermined positions, with a ratio of the maximum amount of angular displacement to the minimum amount of angular displacement for the movement transmission member being smaller than a ratio of the maximum amount of angular displacement to the minimum amount of angular displacement for the wire takeup member.

4. The cable operating mechanism according to claim 1, wherein the first and second pivot axes are disposed with a plane extending through both the first and second pivot axes, with a point of contact between the wire takeup member and the movement transmission member being located on a first side of the plane at a first of the predetermined wire positions representing a fully released position of the wire takeup member, and the point of contact being located on a second, opposite side of the plane at a last of the predetermined wire positions representing a fully pulled position of the wire takeup member.

5. A cable operating mechanism comprising:
a fixed member;
a wire takeup member movably mounted with respect to the fixed member about a first pivot axis to move between a plurality of predetermined wire positions, the wire takeup member including a wire attachment part, the wire takeup member having a different amount of angular displacement for changing between some of the predetermined wire positions than for others of the predetermined wire positions;
a wire pulling member movably mounted with respect to the fixed member; and
a movement transmission member movably mounted with respect to the fixed member about a second pivot axis that is offset from the first pivot axis, the second pivot axis being in a fixed orientation with respect to the fixed member, the movement transmission member being operatively coupled to the wire pulling member and the wire takeup member such that a movement of the wire pulling member is transmitted to the wire takeup member via the movement transmission member, the movement transmission member having a different amount of angular displacement for changing between some of a plurality of predetermined positions than for others of the predetermined positions.

6. The cable operating mechanism according to claim 5, wherein the wire takeup member has a greater amount of angular displacement for changing between each end position of the predetermined wire positions and an adjacent end position than for changing between the predetermined wire positions between two intermediate positions between the end positions, and the movement transmission member has a greater amount of angular displacement for changing between each end position of the predetermined positions and an adjacent end position than for changing between the predetermined positions between two intermediate positions between the end positions.

7. A cable operating mechanism comprising:
a fixed member;
a wire takeup member movably mounted with respect to the fixed member about a first pivot axis to move between a plurality of predetermined wire positions, the wire takeup member including a wire attachment part;
a positioning element that moves with the wire takeup member;
a positioning pawl that engages the positioning element to selectively maintain the wire takeup member in one of the predetermined wire positions;
a wire pulling member movably mounted with respect to the fixed member; and
a movement transmission member movably mounted with respect to the fixed member about a second pivot axis that is offset from the first pivot axis, the second pivot axis being in a fixed orientation with respect to the fixed member, the movement transmission member being operatively coupled to the wire pulling member and the wire takeup member such that a movement of the wire pulling member is transmitted to the wire takeup member via the movement transmission member.

8. The cable operating mechanism according to claim 7, further comprising
a wire releasing member movably mounted with respect to the fixed member, the wire releasing member including a release abutment that engages the positioning pawl to release the positioning element in response to a movement of the wire releasing member.

9. A cable operating mechanism comprising:
a fixed member;
a wire takeup member movably mounted with respect to the fixed member about a first pivot axis to move between a plurality of predetermined wire positions, the wire takeup member including a wire attachment part;
a wire pulling member movably mounted with respect to the fixed member; and
a movement transmission member movably mounted with respect to the fixed member about a second pivot axis that is offset from the first pivot axis, the second pivot axis being in a fixed orientation with respect to the fixed member, the movement transmission member being operatively coupled to the wire pulling member and the wire takeup member such that a movement of the wire pulling member is transmitted to the wire takeup member via the movement transmission member, the movement transmission member slidably contacting the wire takeup member.

10. A cable operating mechanism comprising:

a fixed member;

a wire takeup member movably mounted with respect to the fixed member about a first pivot axis to move between a plurality of predetermined wire positions, the wire takeup member including a wire attachment part;

a wire pulling member movably mounted with respect to the fixed member;

a pulling lever movably mounted with respect to the fixed member, the pulling lever pivotally supporting the wire pulling member thereon; and a movement transmission member movably mounted with respect to the fixed member about a second pivot axis that is offset from the first pivot axis, the second pivot axis being in a fixed orientation with respect to the fixed member, the movement transmission member being operatively coupled to the wire pulling member and the wire takeup member such that a movement of the wire pulling member is transmitted to the wire takeup member via the movement transmission member.

* * * * *